(12) United States Patent
Shen

(10) Patent No.: US 10,710,334 B2
(45) Date of Patent: Jul. 14, 2020

(54) HIGH-STRENGTH WIND-RESISTANT SKID-RESISTANT WATERPROOF UNDERLAYMENT

(71) Applicant: Hangzhou Evergreen Waterproof Material Co., Ltd., Hangzhou (CN)

(72) Inventor: Tengfei Shen, Zhongtai Town (CN)

(73) Assignee: HANGZHOU EVERGREEN WATERPROOF MATERIAL CO., LTD., Hangzhou (CN)

(*) Notice: Subject to any disclaimer, the term of this patent is extended or adjusted under 35 U.S.C. 154(b) by 0 days.

(21) Appl. No.: 16/141,614

(22) Filed: Sep. 25, 2018

(65) Prior Publication Data

US 2019/0022976 A1 Jan. 24, 2019

Related U.S. Application Data

(63) Continuation of application No. 15/304,826, filed as application No. PCT/CN2016/083107 on May 24, 2016, now Pat. No. 10,112,367.

(30) Foreign Application Priority Data

Jul. 28, 2015 (CN) .................... 2015 2 0558084 U

(51) Int. Cl.
 *B32B 11/04* (2006.01)
 *B32B 27/02* (2006.01)
 (Continued)

(52) U.S. Cl.
 CPC ............. *B32B 11/046* (2013.01); *B32B 3/30* (2013.01); *B32B 5/02* (2013.01); *B32B 5/022* (2013.01);
 (Continued)

(58) Field of Classification Search
 None
 See application file for complete search history.

(56) References Cited

U.S. PATENT DOCUMENTS 6,378,259 B1 * 4/2002 Carlson ................ E04D 5/12
 156/291
7,179,761 B2 2/2007 Malik
 (Continued)

FOREIGN PATENT DOCUMENTS

| CN | 201128259 | * 10/2008 |
| CN | 202047480 | * 11/2011 |

OTHER PUBLICATIONS

CN202047480U_Machine_Translate (Year: 2011).*
(Continued)

*Primary Examiner* — Babajide A Demuren
(74) *Attorney, Agent, or Firm* — Berkeley Law & Technology Group, LLP

(57) ABSTRACT

The present invention relates to the technical field of waterproof materials, and particularly to a high-strength wind-resistant skid-resistant waterproof underlayment. The high-strength wind-resistant skid-resistant waterproof underlayment comprises a first non-woven fabric layer, a first film layer, a first asphalt layer, a gridding cloth layer, a second asphalt layer, a second non-woven fabric layer, a second film layer and a third non-woven fabric layer laminated successively; the first film layer and the second film layer are waterproof elastic films respectively. The object of the present invention is to provide a high-strength wind-resistant skid-resistant waterproof underlayment. The waterproof underlayment formed by structures such as a first film layer and a second film layer and the like can be fixed through nails on a roof made of a wood structure, etc., and the construction is quick, convenient, and labor-saving, and the waterproofness is good.

19 Claims, 1 Drawing Sheet

(51) Int. Cl.
*B32B 5/02* (2006.01)
*B32B 27/12* (2006.01)
*B32B 3/30* (2006.01)
*B32B 27/32* (2006.01)
*B32B 7/04* (2019.01)
*B32B 11/10* (2006.01)
*B32B 33/00* (2006.01)

(52) U.S. Cl.
CPC ............... *B32B 7/04* (2013.01); *B32B 11/10* (2013.01); *B32B 27/02* (2013.01); *B32B 27/12* (2013.01); *B32B 27/32* (2013.01); *B32B 11/04* (2013.01); *B32B 33/00* (2013.01); *B32B 2250/05* (2013.01); *B32B 2262/0276* (2013.01); *B32B 2307/51* (2013.01); *B32B 2307/558* (2013.01); *B32B 2307/71* (2013.01); *B32B 2307/724* (2013.01); *B32B 2307/7265* (2013.01); *B32B 2307/732* (2013.01); *B32B 2307/744* (2013.01); *B32B 2419/04* (2013.01); *B32B 2419/06* (2013.01)

(56) References Cited

U.S. PATENT DOCUMENTS

| | | | | |
|---|---|---|---|---|
| 7,977,259 B2* | 7/2011 | Ratcliff | ............... | B32B 11/10 428/340 |
| 8,105,965 B2* | 1/2012 | Zhang | ............... | B32B 11/04 442/327 |
| 8,440,289 B2* | 5/2013 | De Giuseppe | ............ | B32B 3/30 428/156 |
| 8,946,101 B2* | 2/2015 | Moulton | ............... | B32B 5/02 264/210.1 |
| 9,540,820 B2* | 1/2017 | Kalkanoglu | ............ | B32B 11/10 |
| 2004/0148887 A1* | 8/2004 | Di Pede | ............... | B32B 3/30 52/408 |
| 2006/0096218 A1* | 5/2006 | Johnson | ............... | E04D 12/002 52/506.01 |
| 2007/0004301 A1* | 1/2007 | Heinrich | ............... | A62D 5/00 442/121 |
| 2007/0173159 A1 | 7/2007 | Miwa | | |
| 2008/0026663 A1* | 1/2008 | Zhang | ............... | B32B 11/04 442/398 |
| 2009/0064628 A1 | 3/2009 | Mellott | | |
| 2012/0196496 A1* | 8/2012 | Granovsky | ........ | D03D 15/0094 442/189 |
| 2014/0259972 A1* | 9/2014 | Feuer | ............... | E04D 7/00 52/58 |
| 2016/0289953 A1* | 10/2016 | Silvers | ............... | B32B 5/022 |
| 2016/0362849 A1* | 12/2016 | Kim | ............... | C08J 9/00 |
| 2017/0114542 A1 | 4/2017 | Khan et al. | | |
| 2017/0190146 A1 | 7/2017 | Shen | | |
| 2017/0260738 A1 | 9/2017 | Harrison | | |

OTHER PUBLICATIONS

CN201128259_Machine_Translate (Year: 2008).*
U.S. Appl. No. 15/304,826 Application and Preliminary Amendment as filed Oct. 17, 2016, 33 pages.
U.S. Appl. No. 15/304,826 Filing Receipt, filed Mar. 29, 2017, 3 pages.
U.S. Appl. No. 15/304,826 Non-Final Rejection, dated May 3, 2017, 8 pages.
U.S. Appl. No. 15/304,826 Notice of Publication, dated Jul. 6, 2017, 1 page.
U.S. Appl. No. 15/304,826 Amendment/Req. Reconsideration-After Non-Final Reject, dated Sep. 1, 2017, 25 pages.
U.S. Appl. No. 15/304,826 Non-Final Rejection, dated Nov. 14, 2017, 9 pages.
U.S. Appl. No. 15/304,826 Amendment/Req. Reconsideration-After Non-Final Reject, dated Feb. 14, 2018, 21 pages.
U.S. Appl. No. 15/304,826 Final Rejection, dated May 11, 2018, 6 pages.
U.S. Appl. No. 15/304,826 Response After Final Action, dated Jun. 1, 2018, 8 pages.
U.S. Appl. No. 15/304,826 Notice of Allowance and Fees Due, dated Jun. 26, 2018, 5 pages.
U.S. Appl. No. 15/304,826 Issue Fee Payment, dated Sep. 25, 2018, 1 page.
U.S. Appl. No. 15/304,826 Specification, filed Sep. 28, 2018, 4 pages.
U.S. Appl. No. 15/304,826 Issue Notification, dated Oct. 10, 2018, 1 page.

* cited by examiner

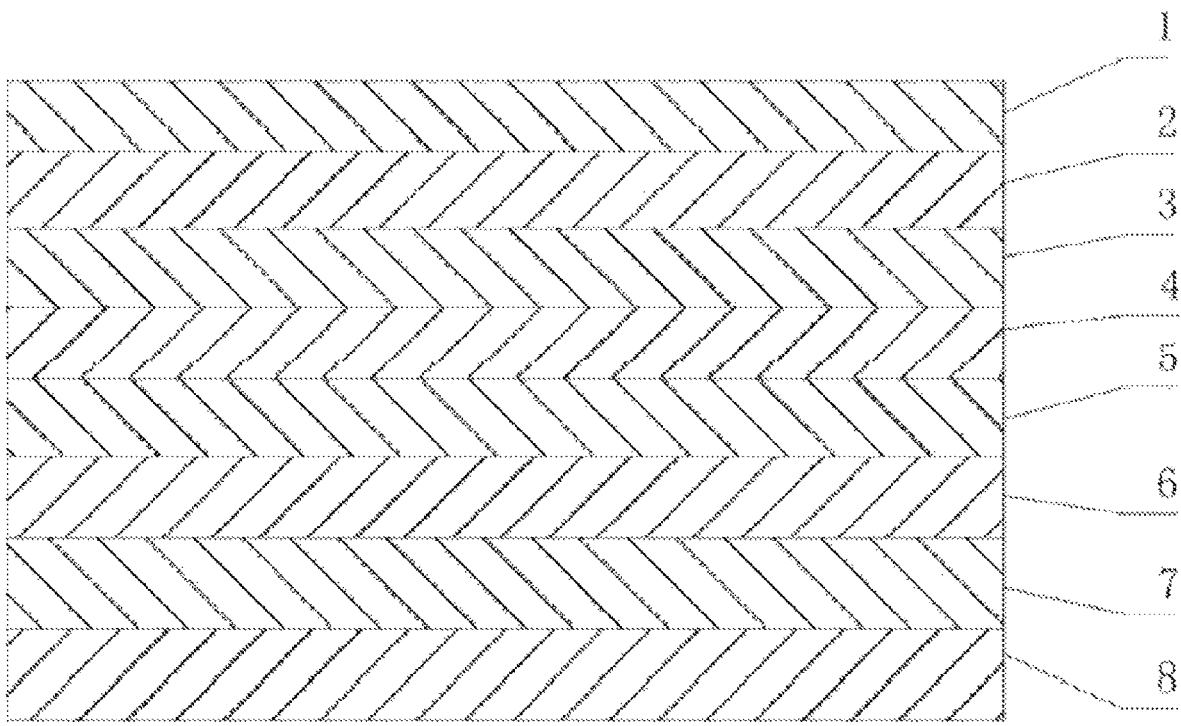

HIGH-STRENGTH WIND-RESISTANT SKID-RESISTANT WATERPROOF UNDERLAYMENT

CROSS REFERENCE TO RELATED APPLICATIONS

This application is a continuation of U.S. patent application Ser. No. 15/304,826, entitled "High-Strength Wind-Resistant Skid-Resistant Waterproof Underlayment," filed Oct. 17, 2016, which is a 371 of International Application No. PCT/CN2016/083107, entitled "High strength windproof slip-proof water-proof sheet layer," filed May 24, 2016; both patent applications of which are expressly incorporated in their entirety herein by reference.

TECHNICAL FIELD

The present invention relates to the technical field of waterproof materials, and particularly to a high-strength wind-resistant skid-resistant waterproof underlayment.

BACKGROUND ART

A waterproof underlayment, playing an important role in a tile surface, is a structural layer provided under the tile, and serves waterproof and moisture-proof functions, because the "tile" itself cannot be considered as a waterproof material, and only after the tile and a waterproof underlayment are combined, can a waterproof barrier be formed.

The construction of conventional waterproof underlayment requires a lot of labors due to its complexity; for example, in the buildings from Ming and Qing Dynasties, a waterproof underlayment is composed of a roof boarding made of graphite containing impurities, roofing formed of some material, roofing made of graphite containing impurities, paint formed by processing China wood oil and so on, reaching an overall thickness of up to 15 cm, and being capable of preventing penetration for hundred years.

For existing waterproof underlayment, a cold pasting construction method is usually used to paste a waterproof coiled material on a wood-structure roofing formed by cement tile, colored clay tile and asphalt tile, etc. Such construction is quick, convenient, and labor-saving. However, the cold pasting construction method only provides a limited adhesion force, and the waterproof underlayment will likely become loose, leading to water penetration.

Therefore, to overcome the above-mentioned problems, it is urgent to provide a novel high-strength wind-resistant skid-resistant waterproof underlayment.

DISCLOSURE OF THE INVENTION

The object of the present invention is to provide a high-strength wind-resistant skid-resistant waterproof underlayment. The waterproof underlayment is formed by structures such as a first film layer and a second film layer, and can be fixed through nails on roofing made of a wood structure and the like, and the construction is quick, convenient, and labor-saving, and the waterproofness is good.

The present invention provides a high-strength, wind-resistant, skid-resistant and waterproof underlayment, wherein the waterproof underlayment comprises successively: a first non-woven fabric layer, a first film layer, a first asphalt layer, a gridding cloth layer, a second asphalt layer, a second non-woven fabric layer, a second film layer and a third non-woven fabric layer;

the first non-woven fabric layer, the first film layer, the first asphalt layer, the gridding cloth layer, the second asphalt layer, the second non-woven fabric layer, the second film layer and the third non-woven fabric layer are laminated as one piece; and the first film layer and the second film layer are waterproof elastic film layers respectively.

Further, the waterproof elastic film layers are polyethylene films or polypropylene films.

Further, the first film layer is a polyethylene film, and the second film layer is a polypropylene film.

Further, a surface of the first non-woven fabric layer is provided with first protruding lines.

Further, a surface of the second non-woven fabric layer is provided with second protruding lines.

Further, a surface of the third non-woven fabric layer is provided with third protruding lines.

Further, all of the first protruding lines, the second protruding lines and the third protruding lines present a grid form.

Further, the first non-woven fabric layer, the second non-woven fabric layer and the third non-woven fabric layer respectively have a thickness of 0.04-0.06 mm.

Further, the waterproof elastic film layer has a thickness of 0.06-0.08 mm; the first asphalt layer and the second asphalt layer respectively have a thickness of 0.12-0.16 mm.

Further, the first non-woven fabric layer, the first film layer, the first asphalt layer, the gridding cloth layer, the second asphalt layer, the second non-woven fabric layer, the second film layer and the third non-woven fabric layer have a total thickness of 0.5-1.0 mm.

The high-strength wind-resistant skid-resistant waterproof underlayment provided in the present invention uses strong durable gridding cloth layer as a felt, providing about 80% of strength of the waterproof underlayment, effectively preventing the waterproof underlayment from deformation due to collision and extrusion by external forces, and improving the impact resistance of the waterproof underlayment; the gridding cloth layer is provided with the first asphalt layer and the second asphalt layer respectively on both surfaces, improving the waterproof performance of both surfaces of the gridding cloth layer, and doubly ensuring the waterproof performance of the waterproof underlayment; the non-woven fabric (preferably polyester fiber non-woven fabric) has features of moisture resistance, air permeability, flexibility, light weight, non-combustion-supporting property, high decomposability, non-toxic and non-irritating property, low price, recyclability and reusability, etc., and the process therefor has a short process flow, a quick manufacturing speed, a high yield, low cost and a lot of material sources, which can reduce the cost and the weight of the waterproof underlayment; the non-woven fabric has an excellent skid resistance, a strong resistance to UV, and a strong resistance to ageing, thus, the first non-woven fabric layer on the one hand increases the friction coefficient of the surfaces of the waterproof underlayment, and improves its skid resistance, so that constructors will not likely slip during construction, thereby improving the construction safety at construction sites, such as roofs, especially on sloped roofs, and on the other hand improves the UV resistance and ageing resistance of the waterproof underlayment, thereby improving the ageing resistance of the waterproof underlayment; the third non-woven fabric layer, with its excellent skid resistance, can be better laid on roofs made of wood structures, etc., helping constructors in construction; the first film layer and the second film layer are used so that when an external object such as a nail pierces through the waterproof underlayment, the first film layer and the second film layer respectively wrap where is pierced by the external object in an effective way, preventing the waterproof underlayment from water penetration due to piercing by the external object; with the double protection of the first film layer and the second film layer, the waterproof underlayment can be fixed on roofs made of wood structures, etc. with nails and the like, and the construction is quick, convenient and firm, without influencing its waterproof performance.

BRIEF DESCRIPTION OF DRAWINGS

In order to more clearly illustrate technical solutions in embodiments of the present invention or in the prior art, figures which are needed for description of the embodiments or the prior art will be introduced briefly below. Apparently, the figures in the following description show some embodiments of the present invention, and a person ordinarily skilled in the art still can obtain other relevant figures according to these figures, without paying inventive efforts.

FIG. 1 is a structural schematic diagram of a high-strength wind-resistant skid-resistant waterproof underlayment provided in an example of the present invention.

REFERENCE SIGNS 1-first non-woven fabric layer; 2-first film layer; 3-first asphalt layer; 4-gridding cloth layer; 5-second asphalt layer; 6-second non-woven fabric layer; 7-second film layer; 8-third non-woven fabric layer.

DETAILED DESCRIPTION OF EMBODIMENTS

Below, the technical solutions of the present invention will be described clearly and completely in conjunction with the figures. Apparently, some but not all of examples of the present invention are described. Based on the examples of the present invention, all the other examples, which can be obtained by a person skilled in the art without paying inventive efforts, fall within the scope of protection of the present invention.

In the description of the present invention, it should be noted that orientational or positional relationships indicated by terms such as "center", "upper", "lower", "left", "right", "vertical", "horizontal", "inner", and "outer" are based on orientational or positional relationships as shown in the FIGURE, merely for facilitating describing the present invention and simplifying the description, rather than indicating or suggesting that related devices or elements have to be in the specific orientation or configured and operated in specific orientation, therefore, they should not be construed as limiting the present invention. Besides, terms "first", "second", "third" and so on are merely for descriptive purpose, but should not be understood as indicating or suggesting to have importance in relativity.

In the description of the present invention, it should be indicated that unless otherwise expressly specified and defined, terms "installation", "link" and "connection" should be understood widely. For example, it may be a fixed connection, a detachable connection, or an integrated connection; it may be a mechanical connection, or an electrical connection; it may be a direct connection, or an indirect connection through an intermediate medium; and it also may be an inner communication between two elements. For a person ordinarily skilled in the art, the specific meanings of the above-mentioned terms in the present invention can be understood according specific circumstances.

EXAMPLES

Referring to FIG. 1, the present example provides a high-strength wind-resistant skid-resistant waterproof underlayment. The FIGURE is a structural schematic diagram of the high-strength wind-resistant skid-resistant and waterproof underlayment provided in the example of the present invention, wherein section lines shown in the FIGURE do not intend to show section lines, but for the purpose of more clearly showing a first non-woven fabric layer, a first film layer, a first asphalt layer, a gridding cloth layer, a second asphalt layer, a second non-woven fabric layer, a second film layer and a third non-woven fabric layer.

Referring to FIG. 1, the high-strength wind-resistant skid-resistant waterproof underlayment provided in the present example comprises successively: a first non-woven fabric layer 1, a first film layer 2, a first asphalt layer 3, a gridding cloth layer 4, a second asphalt layer 5, a second non-woven fabric layer 6, a second film layer 7 and a third non-woven fabric layer 8. That is to say, both outer surfaces of the waterproof underlayment are non-woven fabric layers, i.e., the first non-woven fabric layer 1 and the third non-woven fabric layer 8.

The first non-woven fabric layer 1, the first film layer 2, the first asphalt layer 3, the gridding cloth layer 4, the second asphalt layer 5, the second non-woven fabric layer 6, the second film layer 7 and the third non-woven fabric layer 8 are laminated as one piece.

The first film layer 2 and the second film layer 7 are waterproof elastic film layers respectively.

In the present example, the strong durable gridding cloth layer 4 is used as a felt, providing about 80% of strength of the waterproof underlayment, effectively preventing the waterproof underlayment from deformation due to collision and extrusion by external forces, and improving the impact resistance of the waterproof underlayment; the gridding cloth layer 4 is provided with the first asphalt layer 3 and the second asphalt layer 5 respectively on both surfaces, improving the waterproof performance of both surfaces of the gridding cloth layer 4, and doubly ensuring the waterproof performance of the waterproof underlayment; the non-woven fabric has features of moisture resistance, air permeability, flexibility, light weight, non-combustion-supporting property, high decomposability, non-toxic and non-irritating property, low price, recyclability and reusability, etc., and the process therefor has a short process flow, a quick manufacturing speed, a high yield, low cost and a lot of material sources, which can reduce the cost and the weight of the waterproof underlayment; the non-woven fabric has an excellent skid resistance, a strong resistance to UV, and a strong resistance to ageing, thus, the first non-woven fabric layer 1 on the one hand increases the friction coefficient of the surfaces of the waterproof underlayment, and improves its skid resistance, so that constructors will not likely slip during construction, thereby improving the construction safety at construction sites such as roofs, especially on sloped roofs, and on the other hand improves the UV resistance and ageing resistance of the waterproof underlayment, thereby improving the ageing resistance of the waterproof underlayment; the third non-woven fabric layer 8, with its excellent skid resistance, can be better laid on roofs made of wood structures, etc., helping constructors in construction; the first film layer 2 and the second film layer 7 are used so that, when an external object such as a nail pierces through the waterproof underlayment, the first film layer 2 and the second film layer 7 respectively wrap where is pierced by the external object in an effective way, preventing the waterproof underlayment from water penetration due to piercing by the external object; with the double protection of the first film layer 2 and the second film layer 7, the waterproof underlayment can be fixed on roofs made of wood structures, etc. with nails and the like, and the construction is quick, convenient and firm, without influencing its waterproof performance.

Specifically, the first non-woven fabric layer 1, the first film layer 2, the first asphalt layer 3, the gridding cloth layer 4, the second asphalt layer 5, the second non-woven fabric layer 6, the second film layer 7 and the third non-woven fabric layer 8 are molded through hot pressing; that is, the first non-woven fabric layer 1, the first film layer 2, the first asphalt layer 3, the gridding cloth layer 4, the second asphalt layer 5, the second non-woven fabric layer 6, the second film layer 7 and the third non-woven fabric layer 8 are hot-pressed into one piece, forming the waterproof underlayment.

The waterproof elastic film layers in the present example use an existing material, is waterproof, and can form, due to its elasticity, effective wrapping for the position pierced through by an external object when the external object, such as a nail, etc. pierces through the waterproof underlayment, preventing the waterproof underlayment from water penetration due to piercing by the external object; preferably, the waterproof elastic film layers are polyethylene films or polypropylene films, so as to prevent the waterproof underlayment from water penetration when pierced, prolonging the service life, reducing the maintenance cost, and ensuring the overall waterproof performance of the waterproof underlayment.

The first film layer 2 and the second film layer 7 can be made of a same film layer or different film layers; preferably, the first film layer 2 is a polyethylene film, and the second film layer 7 is a polypropylene film; alternatively, the first film layer 2 is a polypropylene film, and the second film layer 7 is a polyethylene film.

In an optional solution of the present example, a surface of the first non-woven fabric layer 1 is provided with first protruding lines (not shown in the FIGURE). The first protruding lines protrude from the first non-woven fabric layer 1, so as to increase the surface area per unit area of the first non-woven fabric layer 1, increasing the contact area of the first non-woven fabric layer 1. Meanwhile, the first protruding lines increase the friction coefficient of the first non-woven fabric layer 1, which, on the one hand, increases the friction coefficient of the surface of the waterproof underlayment and improves its skid resistance, so that constructors will not likely slip during construction, thereby improving the construction safety at construction sites such as roofs, particularly sloped roofs, and on the other hand, make the first film layer 2 more firmly connected onto the first non-woven fabric layer 1, preventing the waterproof underlayment from cracks occurring due to external collision, effectively improving the structural strength of the waterproof underlayment, and enhancing the waterproof performance of the waterproof underlayment.

A surface of the second non-woven fabric layer 6 is provided with second protruding lines (not shown in the FIGURE). The second protruding lines protrude from the second non-woven fabric layer 6, so as to increase the surface area per unit area of the second non-woven fabric layer 6, increasing the contact area of the second non-woven fabric layer 6. Meanwhile, the second protruding lines increase the friction coefficient of the second non-woven fabric layer 6, so that the second asphalt layer 5 and/or the second film layer 7 can be more firmly connected onto the second non-woven fabric layer 6, preventing the waterproof underlayment from cracks occurring due to external collision, effectively improving the structural strength of the waterproof underlayment, and enhancing the waterproof performance of the waterproof underlayment.

Specifically, the first protruding lines can be provided on one surface of the first non-woven fabric layer 1, or also can be provided on both surfaces of the first non-woven fabric layer 1; preferably, the surface of the first non-woven fabric layer 1 close to the first film layer 2 is provided with the first protruding lines, so as to increase the contact area and the friction coefficient between the first non-woven fabric layer 1 and the first film layer 2; the other surface of the first non-woven fabric layer is relatively smooth, making it easy to lay thereon tiles such as cement tiles, colored clay tiles and asphalt tiles and the like.

The second protruding lines can be provided on one surface of the second non-woven fabric layer 6, or also can be provided on both surfaces of the second non-woven fabric layer 6; preferably, both surfaces of the second non-woven fabric layer 6 are provided with the second protruding lines, so as to increase the contact areas and the friction coefficients between the second non-woven fabric layer 6 and the second asphalt layer 5 and between the second non-woven fabric layer and the second film layer 7.

The third protruding lines can be provided on one surface of the third non-woven fabric layer 8, or also can be provided on both surfaces of the third non-woven fabric layer 8; preferably, the surface of the third non-woven fabric layer 8 close to the second film layer 7 is provided with the third protruding lines, so as to increase the contact area and the friction coefficient between the third non-woven fabric layer 8 and the second film layer 7.

The first protruding lines, the second protruding lines and the third protruding lines respectively can be provided on a part of the surfaces of the first non-woven fabric layer 1, the second non-woven fabric layer 6 and the third non-woven fabric layer 8, or also can be provided on all of their surfaces; the specific distribution conditions of the protruding lines on the surfaces of the non-woven fabric layers depend on factors such as thickness, waterproof performance, cost performance of the waterproof underlayment.

The first protruding lines, the second protruding lines and the third protruding lines can be arranged to be of irregular shapes or regular shapes, such as strip shapes or grid forms; the first protruding lines, the second protruding lines and the third protruding lines, can be of a same shape or different shapes; preferably, all of the first protruding lines, the second protruding lines and the third protruding lines have a grid form, so as to improve the structural strength of the waterproof underlayment, facilitating producing and processing of the waterproof underlayment.

The first non-woven fabric layer 1, the second non-woven fabric layer 6 and the third non-woven fabric layer 8 in the present example respectively have a thickness of 0.04-0.06 mm.

The waterproof elastic film layer in the present example has thickness of 0.06-0.08 mm, that is, the first film layer and the second film layer respectively have a thickness of 0.06-0.08 mm.

The first asphalt layer 3 and the second asphalt layer 5 in the present example respectively have a thickness of 0.12-0.16 mm.

In another optional solution of the present example, the first non-woven fabric layer 1, the first film layer 2, the first asphalt layer 3, the gridding cloth layer 4, the second asphalt layer 5, the second non-woven fabric layer 6, the second film layer 7 and the third non-woven fabric layer 8 have a total thickness of 0.5-1.0 mm; using the waterproof underlayment of this thickness not only ensures that the waterproof underlayment has a certain weight, which prevents the waterproof underlayment from being blown away by wind when it is to be laid and results in difficulty in construction, but also ensures that the waterproof underlayment is so light that it can be carried by one person, reducing the labor cost for carrying during the construction.

Finally, it should be indicated that the above-mentioned examples are merely used to illustrate technical solutions of the present invention, rather than limiting the present invention. While detailed description is made to the present invention with reference to the above-mentioned examples, those ordinarily skilled in the art should understand that the technical solutions of the above-mentioned examples can be modified, or equivalent substitutions can be made to some or all of the technical features thereof; and these modifications or substitutions will not make the essence of the corresponding technical solutions depart from the scope of the technical solutions of the examples of the present invention.

The invention claimed is:

1. An article comprising: roofing underlayment comprising:
    a first non-woven fabric layer, a first film layer, a first asphalt layer, a cloth felt layer comprising a first surface and a second surface opposite the first surface, a second asphalt layer, a second non-woven fabric layer, a second film layer, and a third non-woven fabric layer; wherein:
        the cloth felt layer is disposed between the first asphalt layer and the second asphalt layer via hot-pressing at least the first asphalt layer on the first surface and the second asphalt layer on the second surface;
        the first non-woven fabric layer, the first film layer, the first asphalt layer, the cloth felt layer, the second asphalt layer, the second non-woven fabric layer, the second film layer, and the third non-woven fabric layer are laminated as one piece; and
        the first film layer and the second film layer comprise elastic film layers, respectively.

2. The article of claim 1, wherein the elastic film layers comprise a polyethylene film or a polypropylene film.

3. The article of claim 2, wherein the first film layer comprises a polyethylene film, and the second film layer comprises a polypropylene film.

4. The article of claim 1, wherein a surface of the first non-woven fabric layer comprises first protruding lines.

5. The article of claim 1, wherein a surface of the second non-woven fabric layer comprises second protruding lines.

6. The article of claim 1, wherein a surface of the third non-woven fabric layer comprises third protruding lines.

7. The article of claim 6, wherein the first protruding lines, the second protruding lines and the third protruding lines comprise a grid form.

8. The article of claim 6, wherein the first non-woven fabric layer, the second non-woven fabric layer and the third non-woven fabric layer respectively comprise a thickness of approximately 0.04-0.06 mm.

9. The article of claim 8, wherein the elastic film layers comprise a thickness of approximately 0.06-0.08 mm; and at least one of the first or second asphalt layers comprises a thickness of approximately 0.12-0.16 mm.

10. The article of claim 6, wherein the first non-woven fabric layer, the first film layer, the first asphalt layer, the second asphalt layer, the cloth felt layer, the second non-woven fabric layer, the second film layer and the third non-woven fabric layer collectively comprise a thickness of approximately 0.5-1.0 mm.

11. The article of claim 4, wherein the surface of the first non-woven fabric layer comprises a surface proximate to the first film layer.

12. The article of claim 1, wherein both surfaces of the first non-woven fabric layer comprise first protruding lines.

13. The article of claim 1, wherein both surfaces of the second non-woven fabric layer comprise second protruding lines.

14. The article of claim 5, wherein a portion of the surface of the second non-woven fabric layer comprises the second protruding lines.

15. The article of claim 6, wherein the surface of the third non-woven fabric layer comprises a surface proximate to the second film layer.

16. The article of claim 1, wherein both surfaces of the third non-woven fabric layer comprise third protruding lines.

17. The article of claim 1, wherein the cloth felt layer comprises a fourth nonwoven fabric layer.

18. A method of installing an underlayment on a roof, the method comprising:
    affixing a bottom surface of the underlayment to a roof structure;
    laying one or more tiles on a top surface of the underlayment;
    wherein the underlayment comprises:
        a first non-woven fabric layer, a first film layer, a first asphalt layer, a cloth felt layer comprising a first surface and a second surface opposite the first surface, a second asphalt layer, a second non-woven fabric layer, a second film layer and a third non-woven fabric layer; wherein:
            the cloth felt layer is disposed between the first asphalt layer and the second asphalt layer via hot-pressing at least the first asphalt layer on the first surface and the second asphalt layer on the second surface;
            the first non-woven fabric layer, the first film layer, the first asphalt layer, the cloth felt layer, the second asphalt layer, the second non-woven fabric layer, the second film layer and the third non-woven fabric layer are laminated as one piece; and
            the first film layer and the second film layer comprise elastic film layers, respectively.

19. The method of claim 18, wherein the cloth felt layer comprises a fourth nonwoven fabric layer.

\* \* \* \* \*